(12) United States Patent
Fauconnet et al.

(10) Patent No.: US 10,266,372 B2
(45) Date of Patent: Apr. 23, 2019

(54) BUILDING SETTLING DETECTION

(71) Applicant: Otis Elevator Company, Farmington, CT (US)

(72) Inventors: Aurelien Fauconnet, Isdes (FR); Pascal Rebillard, Gien (FR); Gerard Sirigu, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 97 days.

(21) Appl. No.: 15/468,275

(22) Filed: Mar. 24, 2017

(65) Prior Publication Data
US 2017/0297866 A1 Oct. 19, 2017

(30) Foreign Application Priority Data
Apr. 15, 2016 (EP) .................... 16305440

(51) Int. Cl.
| | | |
|---|---|---|
| G05B 15/00 | (2006.01) |
| B66B 5/00 | (2006.01) |
| B66B 1/28 | (2006.01) |
| B66B 1/34 | (2006.01) |
| B66B 5/02 | (2006.01) |
| H04Q 9/00 | (2006.01) |
| G01M 5/00 | (2006.01) |

(52) U.S. Cl.
CPC .............. *B66B 5/0031* (2013.01); *B66B 1/28* (2013.01); *B66B 1/3446* (2013.01); *B66B 5/021* (2013.01); *G01M 5/0025* (2013.01); *G01M 5/0058* (2013.01); *H04Q 9/00* (2013.01); *H04Q 2209/10* (2013.01)

(58) Field of Classification Search
CPC ....... B66B 5/0031; B66B 1/28; B66B 1/3446; B66B 5/021; G01M 5/0025; G01M 5/0058; H04Q 9/00; H04Q 2209/10
USPC .......................................... 187/247
See application file for complete search history.

(56) References Cited

U.S. PATENT DOCUMENTS 3,990,039 A * 11/1976 Miller ...................... G01V 1/16
367/179
4,433,756 A * 2/1984 Caputo ................. B66B 1/3492
187/394
5,103,937 A 4/1992 Robertson
5,861,084 A 1/1999 Barker et al.
(Continued)

FOREIGN PATENT DOCUMENTS

| | | | |
|---|---|---|---|
| CN | 101172550 | 5/2008 | |
| CN | 101172550 A * | 5/2008 | ............. G01M 5/00 |
| JP | 2010208762 | 9/2010 | |

OTHER PUBLICATIONS

European Search Report, European Application No. 16305440.6, dated Oct. 26, 2016, European Patent Office; European Search Report 8 pages.

*Primary Examiner* — Jeffrey Donels
(74) *Attorney, Agent, or Firm* — Cantor Colburn LLP

(57) ABSTRACT

A building settling detection system having at least one sensor configured between a guide rail track of an elevator system and a pit of the elevator system and a controller in communication with the at least one sensor, the controller configured to monitor an output of the at least one sensor and transmit a notification to a remote location when the output of the at least one sensor meets or exceeds a predetermined threshold indicating that the predetermined threshold is met or exceeded.

20 Claims, 5 Drawing Sheets

(56) References Cited

U.S. PATENT DOCUMENTS

| | | | |
|---|---|---|---|
| 5,931,264 | A | 8/1999 | Gillingham et al. |
| 6,578,673 | B2 | 6/2003 | Barker et al. |
| 7,353,916 | B2 | 4/2008 | Angst |
| 8,297,412 | B2 | 10/2012 | Roberts et al. |
| 8,579,089 | B2 | 11/2013 | Hakala et al. |
| 8,973,715 | B2 | 3/2015 | Quinn |
| 9,033,113 | B2 | 5/2015 | Winey |
| 9,038,783 | B2 | 5/2015 | Roberts et al. |
| 9,045,312 | B2 | 6/2015 | Puranen et al. |
| 9,114,954 | B2 | 8/2015 | Boschin et al. |
| 2010/0065381 | A1 | 3/2010 | Roberts et al. |
| 2014/0229011 | A1 | 8/2014 | Fukui et al. |
| 2015/0166304 | A1 | 6/2015 | Roberts et al. |

* cited by examiner

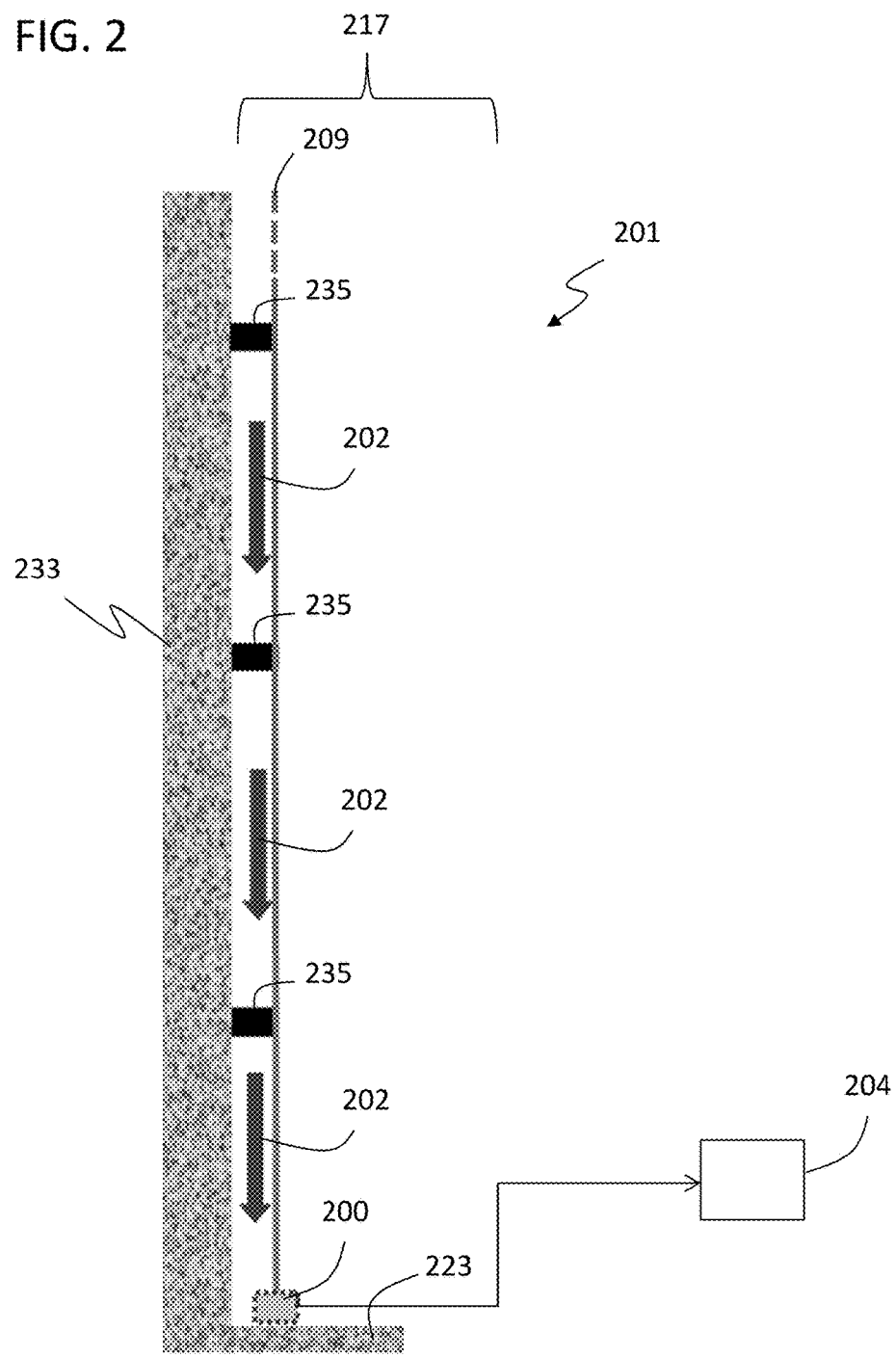

BUILDING SETTLING DETECTION

CROSS-REFERENCE TO RELATED APPLICATIONS

The present application claims priority from European Patent Application No. 16305440.6, filed Apr. 15, 2016. The contents of the priority application are hereby incorporated by reference in their entirety.

BACKGROUND

The subject matter disclosed herein generally relates to elevator systems and, more particularly, to building settling detection in elevator systems.

Building settling may have impacts on elevator systems. For example, during construction, an elevator guide rail (which fixedly connects to the building) should be selected to support the weight of the elevator system and also support increased forces over time due to building settling. Accordingly, the guide rails must be robust to support the forces of both an operating elevator system and a building settling over time.

SUMMARY

According to one embodiment, a building settling detection system is provided. The building settling detection system includes at least one sensor configured between a guide rail track of an elevator system and a pit of the elevator system and a controller in communication with the at least one sensor, the controller configured to monitor an output of the at least one sensor and transmit a notification to a remote location when the output of the at least one sensor meets or exceeds a predetermined threshold indicating that the predetermined threshold is met or exceeded.

In addition to one or more of the features described above, or as an alternative, further embodiments of the building settling detection system may include that at least one sensor of the at least one sensors is a force, displacement, strength, strain, or compression sensor.

In addition to one or more of the features described above, or as an alternative, further embodiments of the building settling detection system may include that the at least one sensor comprises at least one first sensor between a first guide rail and the pit and at least one second sensor between a second guide rail and the pit.

In addition to one or more of the features described above, or as an alternative, further embodiments of the building settling detection system may include that the first guide rail is a guide rail of an elevator car and the second guide rail is a guide rail of a counter weight.

In addition to one or more of the features described above, or as an alternative, further embodiments of the building settling detection system may include that the controller is a controller of the elevator system.

In addition to one or more of the features described above, or as an alternative, further embodiments of the building settling detection system may include that the threshold is a first threshold and when the output of the at least one sensor exceeds the first threshold, the controller is configured to increase a threshold counter by one to a second threshold and the controller monitors the output of the at least one sensor to determine if the output exceeds the second threshold.

In addition to one or more of the features described above, or as an alternative, further embodiments of the building settling detection system may include that when the output of the at least one sensor exceeds a maximum threshold, the controller is configured to disable the elevator system.

In addition to one or more of the features described above, or as an alternative, further embodiments of the building settling detection system may include that the notification is transmitted only when the output of the at least one sensor meets or exceeds the predetermined threshold for longer than a predetermined period of time.

According to another embodiment, a method of monitoring building settling is provided. The method includes monitoring an output of at least one sensor configured between a guide rail of an elevator system and a pit of the elevator system, determining if the output of the at least one sensor meets or exceeds a predetermined threshold, and when the output exceeds the predetermined threshold, transmitting a notification to a remote location indicating the predetermined threshold is met or exceeded.

In addition to one or more of the features described above, or as an alternative, further embodiments of the method may include that the at least one sensor comprises at least one first sensor between a first guide rail and the pit and at least one second sensor between a second guide rail and the pit.

In addition to one or more of the features described above, or as an alternative, further embodiments of the method may include that the first guide rail is a guide rail of an elevator car and the second guide rail is a guide rail of a counter weight.

In addition to one or more of the features described above, or as an alternative, further embodiments of the method may include that the at least one sensor is at least one of a force, displacement, strength, strain, or compression sensor.

In addition to one or more of the features described above, or as an alternative, further embodiments of the method may include that the process is performed by a controller of the elevator system.

In addition to one or more of the features described above, or as an alternative, further embodiments of the method may include that the threshold is a first threshold and when the output of the at least one sensor exceeds the first threshold, the method further comprises increasing a threshold counter by one to a second threshold and monitoring the output of the at least one sensor to determine if the output exceeds the second threshold.

In addition to one or more of the features described above, or as an alternative, further embodiments of the method may include disabling the elevator system when a maximum threshold is exceeded by the output of the at least one sensor.

Technical effects of embodiments of the present disclosure include monitoring systems for monitoring an amount of force applied to guide rails of an elevator system due to building settling. Further technical effects include enabling multiple thresholds that are predefined to enable notification of various building settling amounts such that a maintenance operation can be performed prior to critical amounts of building settling occur.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2 is a schematic illustration of a monitoring system in accordance with a non-limiting embodiment of the present disclosure;

DETAILED DESCRIPTION

Figure 1A:
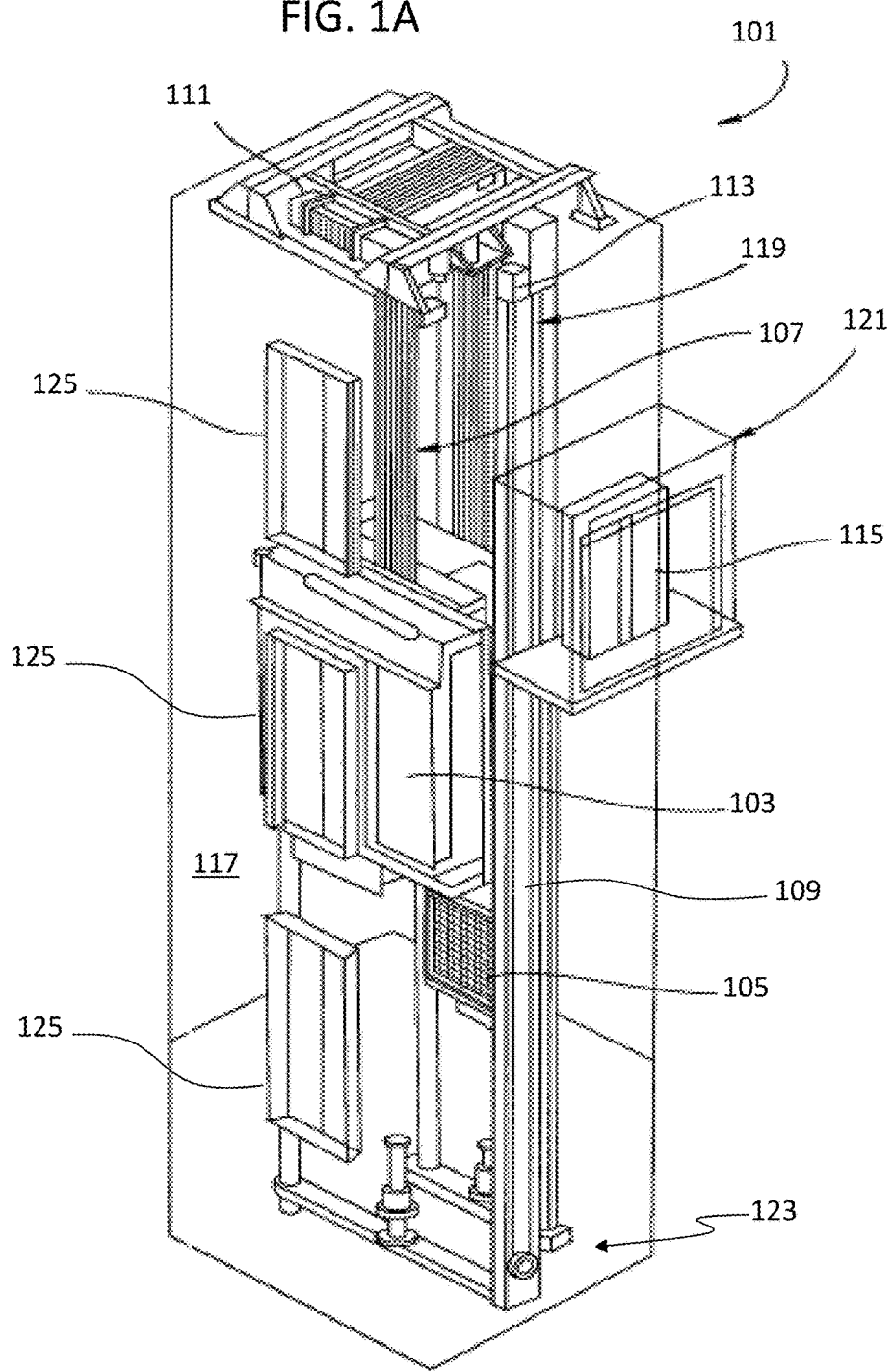
FIG. 1A is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. As shown, the elevator shaft 117 defines a pit 123 at the bottom thereof. Various safety features, stopping mechanisms, and/or other components related to the elevator system 101 can be configured and/or located within the pit 123 of the elevator shaft 117.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft may employ embodiments of the present disclosure. FIG. 1A is merely a non-limiting example presented for illustrative and explanatory purposes.

Figure 1B:
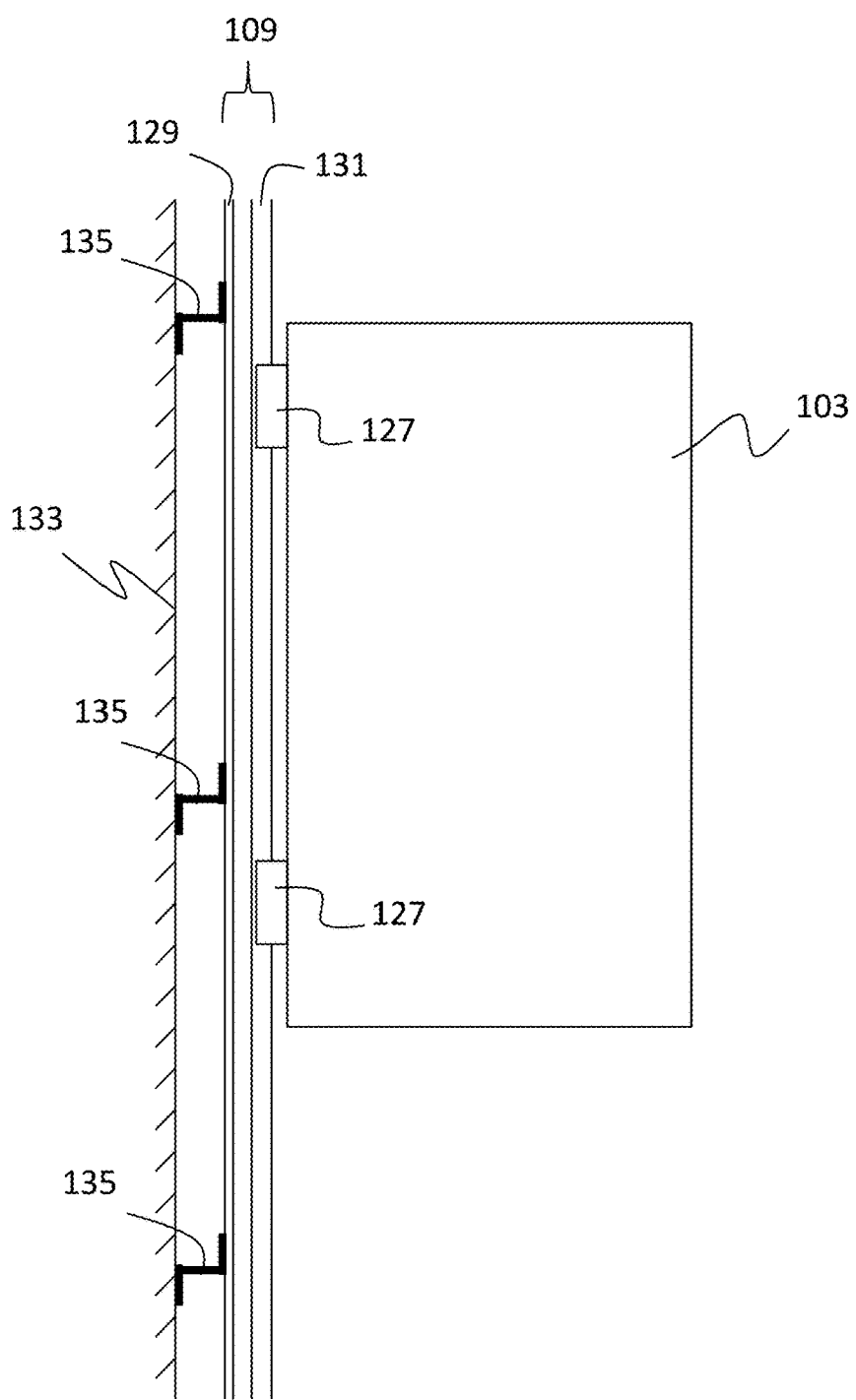
FIG. 1B is a side schematic illustration of an elevator car of FIG. 1A attached to a guide rail track.

FIG. 1B is a side view schematic illustration of the elevator car 103 as operably connected to the guide rail 109. As shown, the elevator car 103 connects to the guide rail 109 by one or more guiding devices 127. The guiding devices 127 may be guide shoes, rollers, etc. The guide rail 109 defines a guide rail track that has a base 129 and a blade 131 extending therefrom. The guiding devices 127 are configured to run along and/or engage with the blade 131. The guide rail 109 mounts to a wall 133 of the elevator shaft 117 by one or more brackets 135. The brackets 135 are configured to fixedly mount to the wall 133 and the base 129 of the guide rail 109 fixedly attaches to the brackets 135. As will be appreciated by those of skill in the art, a guide rail of a counterweight of an elevator system may be similarly configured. The guide rail 109, as shown, is attached or connected to the building (e.g., the wall 133) and extends vertically from the pit 123 to the top of the elevator shaft 117 (e.g., top of the building).

Building settling may have impacts on the elevator systems of buildings. For example, as a building settles, the amount of force applied by the building to the guide rails via the guide rail bracket may increase, thus applying stresses onto the elevator system. If the force is too great, the elevator system may fail. For example, if the building settling is too great, the guide rails of the elevator system may buckle or otherwise fail. Accordingly, it is advantageous to provide sufficiently robust guide rails that can absorb or otherwise manage the increased forces applied by building settling. However, the more robust a guide rail is, the more it will weigh and costs may be increased. Thus, there is a benefit to installing a guide rail having a robust structure but also being low cost and/or relatively light weight. To enable such a balance, it may be advantageous to monitor the amount of building settling and taking corrective or maintenance action only when the building settling has exceeded a specific (e.g., known) amount. For example, if building settling exceeds a predetermined amount, the guide rail brackets and/or the guide rail track may need to be readjusted. Accordingly, embodiments provided herein enable monitoring of building settling through monitoring the force, displacement, etc. of guide rails of an elevator system.

For example, turning now to FIG. 2, a side view schematic illustration of an elevator system 201 having features in accordance with the present disclosure is shown. In FIG. 2, an elevator guide rail 209 is shown extending within an elevator shaft 217 from a pit 223. The guide rail 209 is connected or attached to an associated building by means of brackets 235 that fixedly connect or attach to a wall 233 of the building that defines the elevator shaft 217. In order to detect building settling over time, one or more sensors 200 are configured at the base of the elevator guide rails 203. That is, one or more sensors 200 are configured between a bottom of a guide rail 209 and the pit 223.

The sensors 200 are configured to detect force, displacement, strength, strain, compression, and/or other characteristics that can be used to detect settling of a building. For example, with reference to FIG. 2, the arrows 202 are shown pointing downward and represent a building settling force. As the building settles, it will transfer force from the wall 233 into the brackets 235 and thus into the guide rail 209. The force will operate downward on the guide rail 209 which in turn will apply force into the pit 223. Because the sensors 200 are located between the guide rail 209 and the pit 223, the sensors 200 are positioned to detect the force applied by the building setting, and thus a detection of the building settling can be detected and/or measured.

In some non-limiting embodiments, the sensors 200 can be configured as force sensors that are configured to detect an applied force and convert it to an electrical signal. For example, load cells or other similar devices can be used. The load cells can be located between the base material of the guide rail and the pit and thus can receive a force from the guide rail and convert it to an electrical signal which can be monitored and/or appropriately processed. In such embodiments, the amount of force applied to the sensors will increase as the building settles. Accordingly, the sensors (or an associated system 204) can be configured to monitor for the force reaching and/or surpassing one or more threshold values.

In other non-limiting embodiments, the sensors 200 can be configured as displacement sensors. In such embodiments, the sensors 200 can be configured to monitor and detect an offset or displacement of the guide rail as compared to an initial installation. As the building settles, it will apply more force to the guide rail, and thus the guide rail will push downward into the pit and thus a displacement can be detected. Similar to the prior described embodiment, the sensors (or an associated system 204) can be configured to monitor for the displacement reaching and/or surpassing one or more threshold values.

In some embodiments, one or more sensors may be configured below each guide rail in an elevator system. For example, one or more sensors can be configured beneath a guide rail of an elevator car and also beneath a guide rail of a counterweight. Further, in some embodiments, the sensors that are configured below a guide rail may be a combination of different types of sensors. For example, both force and displacement sensors can be configured beneath a single guide rail, to enable redundant and/or more complete monitoring of building settling.

As noted, multiple sensors and multiple thresholds may be used to monitor building settling. When a building settles, it can apply additional forces and stresses on the guide rails. The additional forces and stresses can cause fatigue in the material of the guiderails, and thus it is advantageous to monitor for when the forces may reach levels that require maintenance to be performed on the elevator system. Accordingly, a monitoring system 204 (shown in FIG. 2) can be used to receive information or data from the one or more sensors 200 and track or monitor building settling. The monitoring system 204, in some embodiments, can be incorporated into the elevator controller and/or elevator control system (e.g., controller 115 shown in FIG. 1A).

The monitoring system 204 can be configured with one or more thresholds that are configured and selected to indicate when a notice or maintenance inspection and/or repair should be made of the elevator system 201. Further, in some embodiments, a threshold may be set such that operation of the elevator system is reduced or completely stopped, e.g., when the detected forces or displacement indicate potential failure in the near future. Accordingly, embodiments of the present disclosure provide a monitoring and notification system that is used to enable early warning and/or prompt inspection/repair of an elevator system due to settling of a building in which the elevator system is located.

Figure 3:
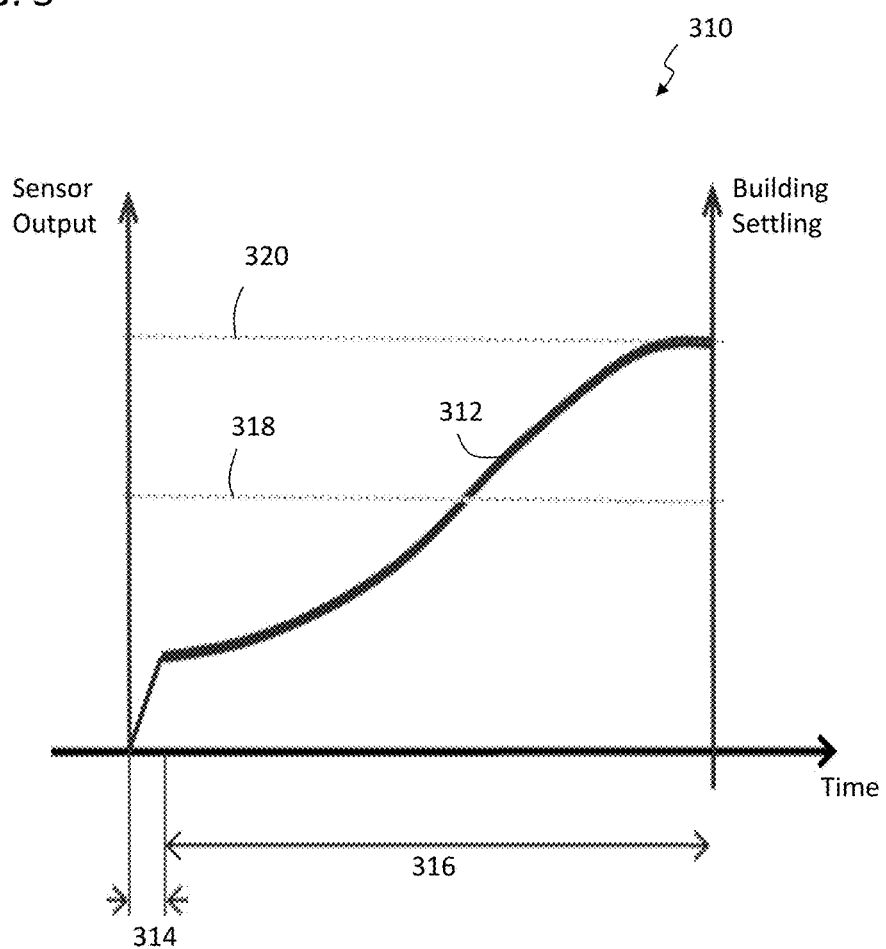
FIG. 3 is a schematic plot of building settling over time as observed by an embodiment of the present disclosure.

Turning now to FIG. 3, a schematic plot related to embodiments of the present disclosure is shown. The plot 310 has time as the horizontal axis, sensor output as the left-vertical axis, and building settling as the right-vertical axis. As will be appreciated by those of skill in the art, the sensor output (e.g., force, displacement, etc.) is linearly related to the amount of building settling. That is, as the building settles more, the output from the sensor will increase. For example, as the building settles, the higher the force that will be applied to a load sensor, or as the building settles, the more displacement of the sensor will be achieved.

The curve 312 represents the sensor output and building displacement as a function of time. In a first time period 314, e.g., an installation period, there is a relatively fast increase in building settling as registered by sensors in the elevator system, for example as shown and described above. However, once the installation is completed, the elevator system may enter second time period 316, e.g., an operational period. During the second time period 316, the elevator system will operate normally, conveying passengers between floors of the building. As shown in plot 310, over time, the building settling increases, and this can be monitored by the one or more sensors that output higher values as time passes.

Sensors as provided herein, or a connected controller, can be configured with one or more thresholds or criteria that trigger a notification and/or reduction in elevator operation. For example, a first threshold 318 can be set such that when the first threshold 318 is met or surpassed in terms of sensor output, a notification can be issued to a remote location, such as a monitoring service, maintenance facility, etc. When the first threshold 318 is met or surpassed, the operation of the elevator system may not be impacted and/or altered. That is, in some embodiments, the only action that occurs when the first threshold 318 is met or surpassed is the transmission of the notification. As will be appreciated by those of skill in the art, multiple factors can influence the one or more thresholds. For example, the rise of the building, the size of the guide rail, the car and/or counterweight weights, operational speeds, etc. can all impact the thresholds of the building settling.

When the second threshold 320 is met or surpassed a second notification can be transmitted to the remote location. Additionally, the second threshold 320 may represent a sufficient building settling that damage may occur to the guide rails and thus operation of the elevator system should be limited or completely stopped.

As will be appreciated by those of skill in the art, any number of thresholds and associated notifications may be set with the system. For example, a first notification may be used to notify a maintenance facility of an increase in the building settling. A second notification may be used to provide a reminder that potential maintenance may be required to be performed soon, and so on.

Figure 4:
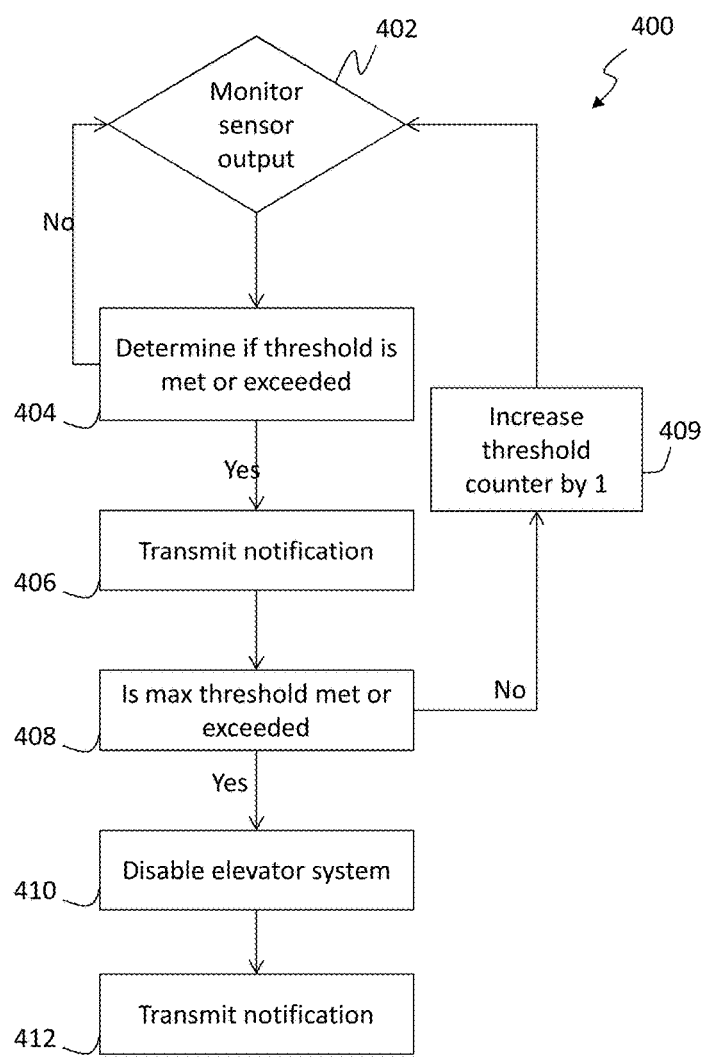
FIG. 4 is a schematic block diagram flow process for monitoring a building settling and providing notifications in accordance with an embodiment of the present disclosure.

Turning now to FIG. 4, a block diagram flow process in accordance with a non-limiting embodiment of the present disclosure is shown. The flow process 400 may be employed by an elevator monitoring system that is configured with one or more sensors located at the base of guide rails of the elevator system and the pit of the elevator shaft. The elevator monitoring system may include a controller or other logic system that is configured to carry out the aspects of the flow process 400. The controller may be part of a general elevator control system or may be independent therefrom. The computing system may be in communication with one or more remote locations that are configured to receive communications from the controller.

At block 402, the system monitors the output of the sensors. At block 404, the system determines if a predetermined threshold of the system is met or exceeded. If it is determined that a threshold is not met or exceeded, the process returns to block 402, and the system continues to monitor the output of the sensors. As will be appreciated by those of skill in the art, the system can filter certain events, such as disregarding events that exceed the threshold, but only occur for a very short or transient period of time (i.e., the threshold is met/exceeded for longer than a predetermined period of time). For example, a threshold may be surpassed during an emergency event (e.g., safety gear actuation, buffer impact, etc.) that would not rise to the level of requiring inspection and/or adjustment due to building settling. Thus, the system can monitor building settling over time, and filter out transient events.

However, if it is determined that a threshold is met or exceeded at block 404, a notification is transmitted to a remote location, as shown at block 406. That is, when the sensors generate an output that exceeds a predetermined value, it can be inferred that the building has settled a particular amount, and thus maintenance should be notified and corrective action may be taken. For example, corrective action can include readjustment guide rail and/or guide rail brackets.

Once the notification is transmitted at block 406, the system determines if the threshold that was met or surpassed was a maximum threshold of the system. If it is determined that the threshold was not a maximum threshold at block 408, the process will increase a threshold counter by one at block 409. The process will then begin again at block 402 and monitor the sensor output. When the process returns to block 404 the system will know that the previous (e.g., first) threshold has been met or passed and thus will determine if the next (e.g., second) threshold is met or exceeded. In some embodiments, if a specific (e.g. first) threshold is met or exceeded, the system can be configured to enter into a low performance mode of operation (e.g., having a reduced operating speed, etc.).

If, at block 408, it is determined that the maximum threshold of the system is exceeded, the system will disable the elevator system at block 410 and send an appropriate notification at block 412. Similar filtering may occur at block 408 as discussed above. The disabling of the elevator system may include delivering any current passengers to their floors (or the nearest floor) and then placing the elevator out of service. The notification sent at block 412 may include both a notification that a threshold has been met or surpassed and/or information relating to the deactivation or disabling of the elevator system.

Those of skill in the art will appreciate that various portions of the flow process 400 can be performed in a different order or may include various other actions without departing from the scope of the present disclosure. Further, some embodiments may omit various aspects of the flow process 400. For example, in some embodiments, if only a single threshold is defined, the system may immediately send a notification and disable the elevator (or enter a low performance mode of operation) when the threshold is met or exceeded.

Advantageously, embodiments provided herein enable a monitoring system for building settling that can impact the operation of an elevator system. Further, advantageously, embodiments provided herein can enable multiple threshold values and/or criteria such that a maintenance operation can be performed on the elevator system prior to critical amounts of building settling occur.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A building settling detection system comprising:
   at least one sensor configured between a guide rail of an elevator system and a pit of the elevator system, wherein the at least one sensor is located between a base material of the guide rail and the pit of the elevator system such that the at least one sensor receives a force from the guide rail, the at least one sensor configured to generate an output based on a received force from the guide rail; and
   a controller in communication with the at least one sensor, the controller configured to monitor the output of the at least one sensor and transmit a notification to a remote location when the output of the at least one sensor meets or exceeds a predetermined threshold indicating that the predetermined threshold is met or exceeded.

2. The building settling detection system of claim 1, wherein at least one sensor of the at least one sensors is a force, displacement, strength, strain, or compression sensor.

3. The building settling detection system of claim 1, wherein the at least one sensor comprises at least one first sensor between a first guide rail and the pit and at least one second sensor between a second guide rail and the pit.

4. The building settling detection system of claim 3, wherein the first guide rail is a guide rail of an elevator car and the second guide rail is a guide rail of a counter weight.

5. The building settling detection system of claim 1, wherein the controller is a controller of the elevator system.

6. The building settling detection system of claim 1, wherein the threshold is a first threshold and when the output of the at least one sensor exceeds the first threshold, the controller is configured to increase a threshold counter by one to a second threshold and the controller monitors the output of the at least one sensor to determine if the output exceeds the second threshold.

7. The building settling detection system of claim 1, wherein when the output of the at least one sensor exceeds a maximum threshold, the controller is configured to disable the elevator system.

8. The building settling detection system of claim 1, wherein the notification is transmitted only when the output of the at least one sensor meets or exceeds the predetermined threshold for longer than a predetermined period of time.

9. A method of monitoring building settling, the method comprising:
   monitoring an output of at least one sensor configured between a guide rail of an elevator system and a pit of the elevator system, wherein the at least one sensor is located between a base material of the guide rail and the pit of the elevator system such that the at least one sensor receives a force from the guide rail;
   determining if the output of the at least one sensor meets or exceeds a predetermined threshold; and
   when the output exceeds the predetermined threshold, transmitting a notification to a remote location indicating the predetermined threshold is met or exceeded.

10. The method of claim 9, wherein the at least one sensor comprises at least one first sensor between a first guide rail and the pit and at least one second sensor between a second guide rail and the pit.

11. The method of claim 10, wherein the first guide rail is a guide rail of an elevator car and the second guide rail is a guide rail of a counter weight.

12. The method of claim 9, wherein the at least one sensor is at least one of a force, displacement, strength, strain, or compression sensor.

13. The method of claim 9, wherein the process is performed by a controller of the elevator system.

14. The method of claim 9, wherein the threshold is a first threshold and when the output of the at least one sensor exceeds the first threshold, the method further comprises increasing a threshold counter by one to a second threshold and monitoring the output of the at least one sensor to determine if the output exceeds the second threshold.

15. The method of claim 9, further comprising disabling the elevator system when a maximum threshold is exceeded by the output of the at least one sensor.

16. A building settling detection system comprising:
   at least one sensor configured between a base material of a guide rail of an elevator system and a pit of the elevator system, the at least one sensor configured to receive a force from the guide rail; and
   a controller in communication with the at least one sensor, the controller configured to monitor an output of the at least one sensor and transmit a notification to a remote location when the output of the at least one sensor meets or exceeds a predetermined threshold indicating that the predetermined threshold is met or exceeded,
   wherein the threshold is a first threshold and when the output of the at least one sensor exceeds the first threshold, the controller is configured to increase a threshold counter by one to a second threshold and the controller monitors the output of the at least one sensor to determine if the output exceeds the second threshold.

17. The building settling detection system of claim 16, wherein at least one sensor of the at least one sensors is a force, displacement, strength, strain, or compression sensor.

18. The building settling detection system of claim 16, wherein the at least one sensor comprises at least one first sensor between a first guide rail and the pit and at least one second sensor between a second guide rail and the pit.

19. The building settling detection system of claim 18, wherein the first guide rail is a guide rail of an elevator car and the second guide rail is a guide rail of a counter weight.

20. The building settling detection system of claim 16, wherein the controller is a controller of the elevator system.

* * * * *